United States Patent
Fujisaki

(10) Patent No.: US 7,553,789 B2
(45) Date of Patent: Jun. 30, 2009

(54) POWDER FOR BLACK ZIRCONIA SINTERED BODY, PRODUCTION METHOD THEREOF, AND SINTERED BODY THEREOF

(75) Inventor: Hiroyuki Fujisaki, Shunan (JP)

(73) Assignee: Tosoh Corporation, Shunan-Shi (JP)

( * ) Notice: Subject to any disclaimer, the term of this patent is extended or adjusted under 35 U.S.C. 154(b) by 206 days.

(21) Appl. No.: 11/748,162

(22) Filed: May 14, 2007

(65) Prior Publication Data

US 2007/0270304 A1 Nov. 22, 2007

(30) Foreign Application Priority Data

May 18, 2006 (JP) .............................. 2006-139462

(51) Int. Cl.
*C04B 35/48* (2006.01)
*C04B 14/00* (2006.01)

(52) U.S. Cl. ...................... 501/105; 501/103; 106/459; 106/480

(58) Field of Classification Search ................. 501/103, 501/105; 106/459, 480
See application file for complete search history.

(56) References Cited

U.S. PATENT DOCUMENTS 5,326,519 A 7/1994 Claussen 5,711,906 A * 1/1998 Briod .......................... 501/86

FOREIGN PATENT DOCUMENTS

| EP | 0 140 638 A1 | 5/1985 |
|---|---|---|
| JP | 2535161 B2 | 6/1996 |
| JP | 10-81562 A | 3/1998 |
| JP | 63-185857 A | 8/1998 |
| JP | 3010236 B2 | 2/2000 |
| JP | 3714563 B2 | 11/2005 |
| JP | 2006-342036 A | 12/2006 |
| WO | WO 2004/048290 A1 | 6/2004 |

OTHER PUBLICATIONS

Extended European Search Report dated Sep. 24, 2007, issued in corresponding European Patent Application No. 07 10 8325.

* cited by examiner

*Primary Examiner*—Karl E Group
(74) *Attorney, Agent, or Firm*—Westerman, Hattori, Daniels & Adrian, LLP.

(57) ABSTRACT

A zirconia-containing powder including 2 to 6 weight % of a pigment which has a spinel structure represented by the chemical formula $(Co_{1-x}Zn_x)(Fe_{1-y}Al_y)_2O_4$ ($0 \leqq x \leqq 0.5$, $0 < y \leqq 0.5$) or which is a coprecipitated material containing Co, Zn, Fe, and Al and has the same spinel structure after calcination, 0.05 to 6 weight % of $Al_2O_3$, and 3.60 to 7.10 weight % of $Y_2O_3$; and a black zirconia sintered body obtained by sintering the zirconia-containing powder within a temperature range of 1300 to 1500° C.

6 Claims, 4 Drawing Sheets

MIRROR-POLISHED SURFACE OF SINTERED BODY SINTERED
AT 1400°C (EXAMPLE 1)

MIRROR-POLISHED SURFACE OF SINTERED BODY SINTERED
AT 1400°C (COMPARATIVE EXAMPLE 1)

SURFACE OF SINTERED BODY AFTER ETCHING TREATMENT AT 1350°C (EXAMPLE 1)

SURFACE OF SINTERED BODY AFTER ETCHING TREATMENT AT 1350°C (COMPARATIVE EXAMPLE 1)

POWDER FOR BLACK ZIRCONIA SINTERED BODY, PRODUCTION METHOD THEREOF, AND SINTERED BODY THEREOF

BACKGROUND OF THE INVENTION

1. Field of the Invention

The present invention relates to zirconia powder for colored zirconia sintered bodies which have no defects and have a jewel-like appearance showing deep black color and where temperature dependency of sintered body density, color migration, cracks, or the like are not observed. The present invention also relates to black zirconia sintered bodies which have no defects and have an excellent appearance, and pigments which are suited for black zirconia.

Priority is claimed on Japanese Patent Application No. 2006-139462, filed May 18, 2006, the content of which is incorporated herein by reference.

Black zirconia sintered bodies are widely used in ornamental articles (such as watch bands, exterior components for watches, watch cases, broaches, tie pins, cuff links, and fitting components of handbags), exterior components in various products (such as cell phones, home appliances, and mobile appliances), semiconductor components, structural components, or the like.

2. Description of the Related Art

Colored zirconia sintered bodies, especially black zirconia sintered bodies are conventionally known. For example, colored zirconia sintered bodies formed from zirconium oxides which contain a group of oxides of C, Cr, Co, Cu, Er, Fe, Ho, Mn, Nb, Ni, Pr, Tm, Ti, V, or the like and a stabilizer, have been proposed (e.g. Patent document 1). Although it is possible to use any colored elements when only blackening of zirconia sintered bodies is desired, various sintered bodies were achieved with different bending strength and/or color tones depending on the kinds of elements used and on their added amounts, which was a problem.

For example, a black zirconia sintered body has been reported where Mn is used as an essential coloring component (Patent document 2). However, the black color of the sintered body containing Mn was bluish- or reddish-black, or colors close to black, and the sintered body containing Mn with sufficient bending strength was also difficult to achieve.

In addition, black zirconia sintered bodies have been reported where pigments containing Cr are used (Patent documents 1 to 4). Although Cr-containing pigments are common as general black pigments, use of black pigments which do not use Cr is preferable as a measure in order to deal with environmental problems.

A black zirconia sintered body has been reported where $CoFe_2O_4$ spinel, which is a pigment that does not contain Cr, is added as a black pigment (Patent document 5). However, in the sintering of black zirconia where a pigment of Co—Fe type is used, coloring elements readily evaporate at high temperatures, causing a problem of contaminating the inside of facilities with the coloring elements (color migration). With such sintered bodies, color tones of the surface thereof deteriorate and it was necessary to grind the surface of the sintered bodies deeply. Moreover, due to the evaporating of coloring components, pores were readily generated on the surface of sintered bodies, which was a problem.

On the other hand, a method is known where $Al_2O_3$ is added in excess as an inhibitor for the evaporation of coloring components (Patent document 6). However, an excessive amount of $Al_2O_3$ is required with the conventional pigments, and since a sufficiently deep black color is not achieved, a reduced amount of $Al_2O_3$ has been used in order to achieve satisfactory color tones, although the occurrence of cracks or the like resulted in reduced production yield.

[Patent document 1] Japanese Unexamined Patent Application, First Publication No. Hei 10-81562 (page 4, section [0016])

[Patent document 2] Japanese Patent Publication No. 3010236 (page 2, column 4, line 3; page 4, section [0016])

[Patent document 3] Japanese Unexamined Patent Application, First Publication No. Sho 63-185857 (page 4, Table 1; page 5, Table 3)

[Patent document 4] Japanese Laid-Open Patent Application No. 2006-342036 (Claims 4 to 7)

[Patent document 5] Japanese Patent Publication No. 3714563 (Claim 1; page 3, section [0004])

[Patent document 6] Japanese Patent Publication No. 2535161 (page 2, column 4, line 20)

As described so far, although zirconia sintered bodies with black color tones are conventionally known to be achievable by the addition of various metal elements or by reduction sintering, black zirconia sintered bodies which satisfy the following features/conditions; i.e. high density, high strength, excellent color tones, and no defects; and a powder containing zirconia which satisfy the following features/conditions; i.e. high sintering yield at the time of producing black zirconia sintered bodies, no sintering-temperature dependency, and no color migration; have not been achieved.

SUMMARY OF THE INVENTION

The present inventors discovered the following as a result of detailed examinations on black zirconia sintered bodies and completed the present invention. That is, when the zirconia-containing powder which is formed by containing 2 to 6 weight % of a pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination; 0.05 to 6 weight % of $Al_2O_3$; and 3.60 to 7.10 weight % of $Y_2O_3$; is used, black zirconia sintered bodies can be achieved which have no sintering-temperature dependency and have high density, high strength, and excellent color tones, and also where color migration due to sintering or the generation of pores on the surface thereof is not observed.

DETAILED DESCRIPTION OF THE INVENTION

Figure 1:
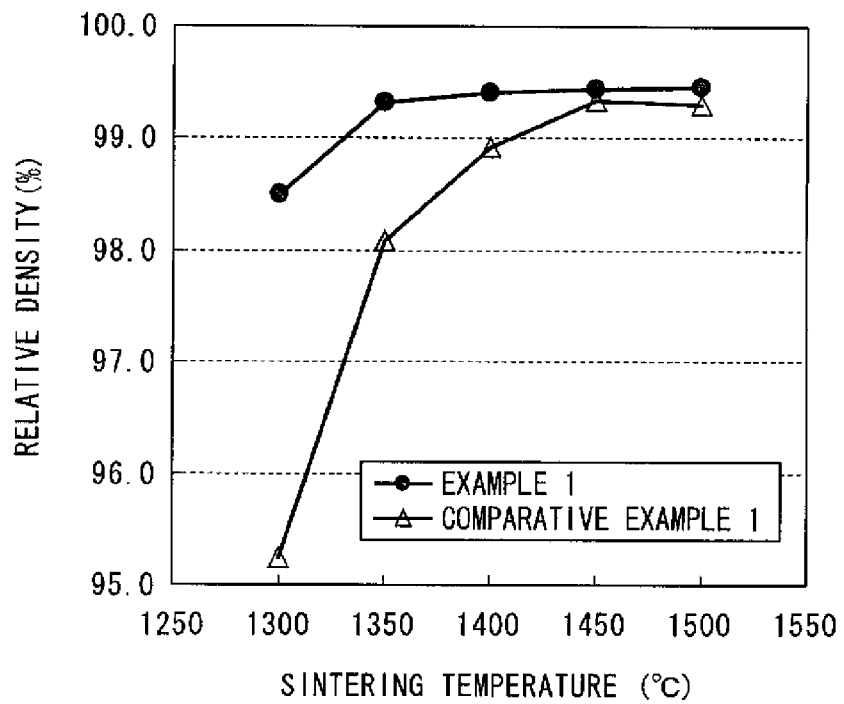
FIG. 1 is a diagram showing changes in the relative density of the black zirconia sintered body from Example 1 and Comparative Example 1 depending on the sintering temperature.
Figure 2:
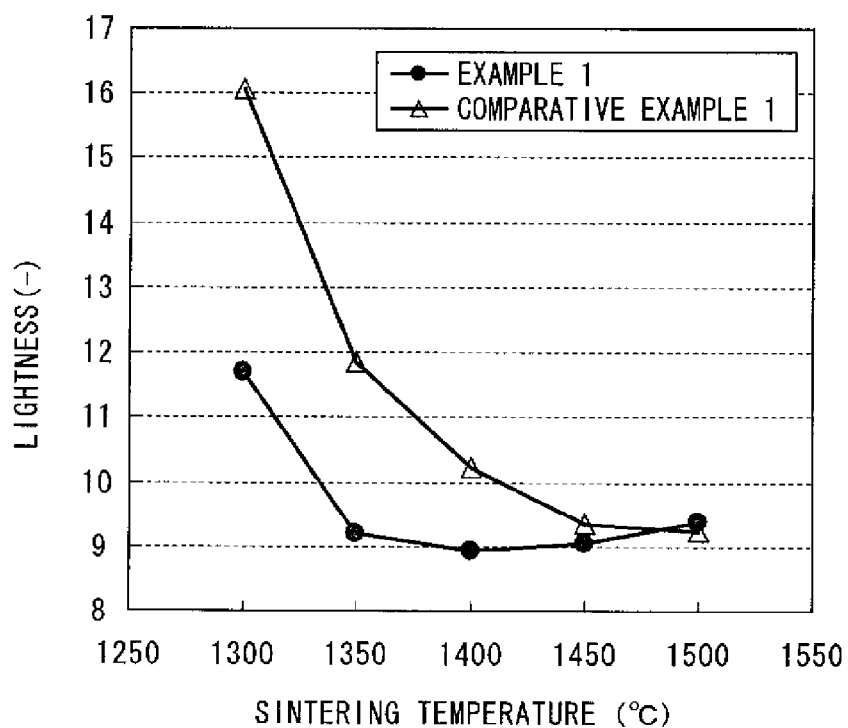
FIG. 2 is a diagram showing changes in the lightness L of the black zirconia sintered body from Example 1 and Comparative Example 1 depending on the sintering temperature.
Figure 3:
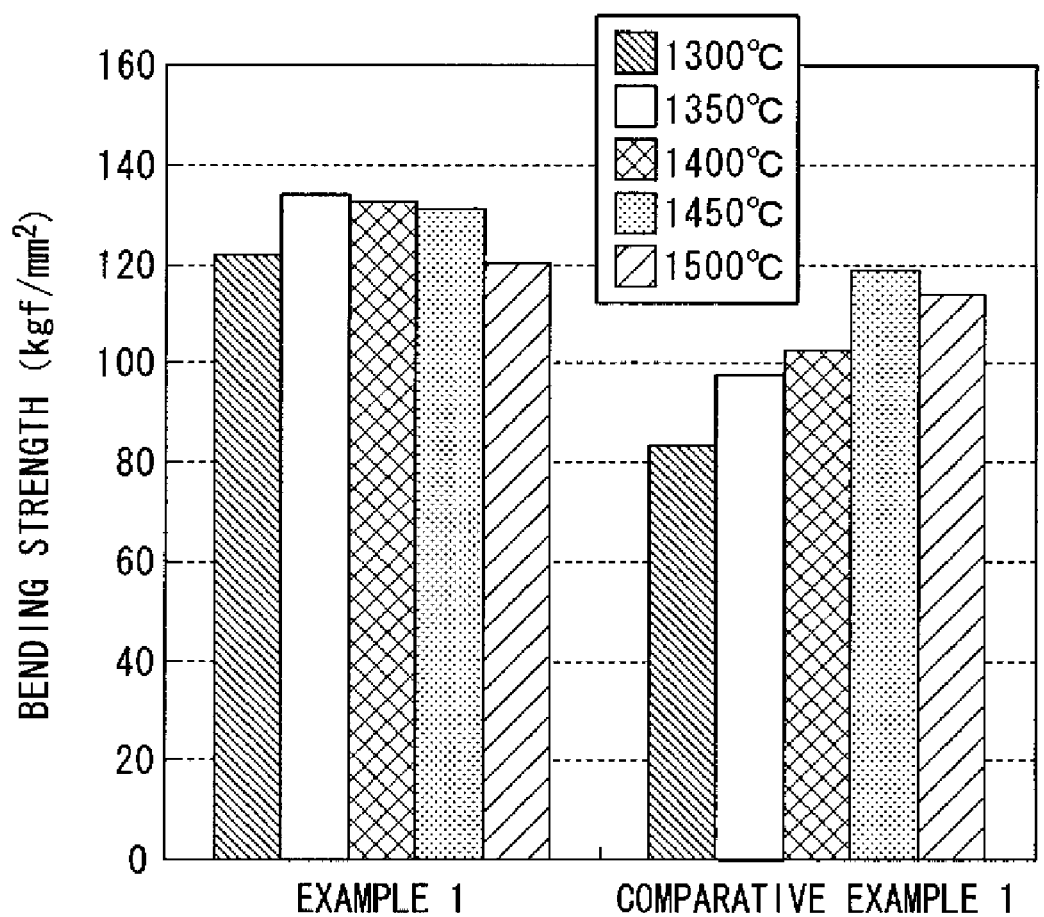
FIG. 3 is a diagram showing changes in the bending strength of the black zirconia sintered body from Example 1 and Comparative Example 1 depending on the sintering temperature.

The present invention will be described in detail below.

The zirconia-containing powder of the present invention is a zirconia-containing powder formed by containing 2 to 6 weight % of a pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination, 0.05 to 6 weight % of $Al_2O_3$, and 3.60 to 7.10 weight % of $Y_2O_3$.

The content of the pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination in the zirconia-containing powder of the present invention is within the range of 2 to 6 weight %. When the content is less than 2 weight %, a deep black color which satisfies the lightness L defined by JIS Z8729 method is difficult to achieve. On the other hand, strength reduces in the black zirconia sintered bodies which are obtained by sintering the zirconia powder where the content of the pigment exceeds 6 weight %.

In the present invention, the substitution rate of Zn with Co in the pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination (that is, the mole ratio of Zn/(Co+Zn), or the value x) is particularly important. From the viewpoints of improving the degree of sintering at low temperatures, stabilization of the density of sintered bodies, and effects in suppressing color migration, the value x should be 0.50 or less. Additionally, when the substitution rate x exceeds 0.5, the color tones of sintered bodies change from black to brown and a black color is not achieved.

In the present invention, the substitution rate of Al with Fe in the pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination (that is, the mole ratio of Al/(Fe+Al), or the value y) should be 0.50 or less from the viewpoints of improving the degree of sintering at low temperatures, prevention of cracks in sintered bodies at high temperatures, effects in suppressing color migration, and effects to prevent losses of pigments on the surface of sintered bodies. When the substitution rate y exceeds 0.5, the color tones of sintered bodies change from black to blue. The substitution of Al in the pigment is essential since zirconia sintered bodies are likely to be cracked at a sintering temperature of 1450° C. or more when the pigment where Al is not substituted at all is used in the sintered bodies. The preferable range of the value y is $0.15 \leq y \leq 0.50$ and the range $0.20 \leq y \leq 0.45$ is particularly preferable.

The pigment in the zirconia-containing powder of the present invention contains Co, Zn, Fe, and Al and has a spinel structure represented by the formula $(Co_{1-x}Zn_x)(Fe_{1-y}Al_y)_2O_4$ ($0 \leq x \leq 0.5$, $0 < y \leq 0.5$) from the beginning or which is a coprecipitated material containing Co, Zn, Fe, and Al and has the spinel structure after calcination as mentioned above and the crystal structure is preferably a spinel structure. Note that elements or the like which are regarded as impurities may be present in the spinel structure in a trace amount within the range where the effects of the present invention are not impaired or be mixed in the spinel structure to form a solid solution.

Although the pigment in the zirconia-containing powder of the present invention which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination, and which contains Co, Zn, Fe, and Al preferably forms a uniform spinel structure as a result of sintering, the pigment may be a material of Co, Zn, Fe, and Al which is subjected to coprecipitation treatment (i.e. a uniform coprecipitate of these elements obtained by the wet method so that the above composition is achieved) or may be that obtained by further subjecting the coprecipitate to heat treatment in order to crystallize.

The zirconia-containing powder of the present invention contains 0.05 to 6 weight % of $Al_2O_3$ separately from the Al present in the abovementioned component of the pigment. By containing such additional $Al_2O_3$, not only do sintered bodies become difficult to break when sintered at high temperatures but also the density of the sintered bodies becomes constant within the sintering-temperature range of 1300 and 1500° C., and thus the product quality can be maintained. Moreover, effects in suppressing color migration and effects to prevent losses of pigments on the surface of sintered bodies are achieved similar to the case found when substituting Fe with Al in the pigment.

When the content of additional $Al_2O_3$ is less than 0.05 weight %, satisfactory effects are not achieved and the density of the sintered bodies is reduced at a sintering-temperature of 1500° C. and moreover, the sintered bodies become prone to cracking. On the other hand, when the content of additional $Al_2O_3$ exceeds 6 weight %, the lightness of sintered bodies increases, sintered bodies with a deep black color are not achieved, and the bending strength of the sintered bodies is also reduced. The content of additional $Al_2O_3$ is particularly preferably 0.5 to 4.0 weight %.

Although it is possible to form $Al_2O_3$ by adding excess Al in the form of $(Co_{1-x}Zn_x)(Fe_{1-y}Al_y)_2O_4$ when obtaining the pigment, it is preferable to add 0.05 to 6 weight % of $Al_2O_3$ separately from the component of the pigment from the viewpoints of uniformity and stability of colorings after sintering.

The preferable range of $Y_2O_3$ content in the zirconia-containing powder of the present invention is 3.60 to 7.10 weight %. When the content is less than 3.60 weight %, the bending strength of sintered bodies becomes a problem since the percentage of monoclinic crystals increases in the sintered bodies after sintering and the aging properties of the sintered bodies are particularly deteriorated. On the other hand, when the content of $Y_2O_3$ exceeds 7.10 weight %, although the percentage of monoclinic crystals decreases and the aging properties improve in sintered bodies, it is not preferable since the reduction in bending strength of the sintered bodies occurs. Accordingly, the amount of $Y_2O_3$ added is within the range of 3.60 to 7.10 weight % and the range between 5.15 and 6.25 weight % is particularly preferable.

Although zirconia in the zirconia-containing powder of the present invention is not particularly limited, the oxide zirconium which is obtained by the hydrolysis of an aqueous solution of a zirconium salt, which has a BET specific surface area of 5 to 20 $m^2/g$, and where the proportion of tetragonal zirconia is 50% or more is preferable. When the powder where alumina is added to the zirconium oxide obtained by hydrolysis is used, sintered bodies having uniform particle diameter are readily achieved and a particularly excellent jewel-like appearance is achieved on the surface of black zirconia sintered bodies.

Next, the black zirconia sintered body of the present invention will be described.

The black zirconia sintered body of the present invention is a black zirconia sintered body which is formed by containing 2 to 6 weight % of a pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination; 0.05 to 6 weight % of $Al_2O_3$; and 3.60 to 7.10 weight % of $Y_2O_3$.

By satisfying the abovementioned composition, the black zirconia sintered body of the present invention satisfies the condition of the lightness L, which is a color parameter defined in JIS Z8729, of less than 10 and is particularly excellent in color tones.

The black zirconia sintered body of the present invention is premium black without reddish or bluish colors. For example, the sintered body of the present invention has chromaticities a and b, which are color parameters defined in JIS Z8729, that satisfy the conditions of $-1<a<1$ and $-1<b<1$, respectively. Moreover, the lightness L, which is a color parameter defined in JIS Z8729, of less than 10 is achieved in the sintered body of the present invention. Although the lower limit of the lightness L is not limited, approximately 7 to 9 is preferable.

In the black zirconia sintered body of the present invention, the relative density of sintered body is preferably 99.0% or more. Since the theoretical density of sintered bodies varies depending on the loadings of additives, the values of specific gravity of the compounds to be mixed are calculated according to the rule of mixtures and are used as the theoretical density. The relative density in the present invention is defined as the value which is derived by dividing the density of a sintered body by the sintered body's theoretical density and is presented as percentage values. In other words, the relative density in the present invention is calculated by the formula below:

$$\text{Relative density}(\%) = \frac{\text{density of sintered body}}{\text{theoretical density (calculated)}} \times 100$$

The density of the sintered body which satisfies the abovementioned value of preferable relative density is achieved in a temperature range between 1300 and 1500° C. In addition, the density of the sintered body varies little within the temperature range, and thus uniform density of the sintered body is achieved within a wide temperature range.

The term "bending strength" used in the present invention refers to the three-point bending strength defined in JIS R1601. The sintered body of the present invention is preferably a black zirconia sintered body which has a bending strength of 110 kgf/mm² or more, which has no cracks, which has mechanical properties that are stable regardless of sintering temperatures, and which has excellent aging properties.

The term "aging property" in the present invention refers to the percentage of monoclinic crystals on the surface of sintered bodies after the sintered bodies are treated in hot water of 140° C. for 24 hours. The percentage of monoclinic crystals on the surface of sintered bodies after the above aging treatment is preferably 50% or less, more preferably 30% or less, and particularly preferably less than 20%.

Although the initial percentage of monoclinic crystals in sintered bodies of the present invention is 20% or less, it is preferably 10% or less and particularly preferably less than 5%. In the sintered bodies where the percentage of monoclinic crystals exceeds 20%, a jewel-like appearance is difficult to achieve on the surface thereof.

The percentage of monoclinic crystals is calculated from the diffracted wave measured by X-ray diffraction and by use of the formula below.

Percentage of monoclinic crystal(%)=($Im$(111)+$Im$(11−1))/($Im$(111)+$Im$(11−1)+$It$(111))×100

In the formula, Im(111) represents the diffraction intensity of a monoclinic crystal (111), Im(11−1) represents the diffraction intensity of a monoclinic crystal(11−1), and It(111) represents the diffraction intensity of a tetragon (111).

The sintered body of the present invention preferably has a pore formation rate of 50% or less on the surface thereof after the surface has been subjected to a mirror-polishing followed by a 1-hour etching treatment at a temperature which is 50° C. lower than the sintering temperature.

The pore formation rate at the surface of sintered bodies is represented by the proportion between the number of dark flecks observed on the surface using a scanning electron microscope (SEM) after mirror-polishing the surface, and the number of pores observed on the surface after the etching treatment at a temperature which is 50° C. lower than the sintering temperature, using SEM with the same magnification as that used when the dark flecks were observed. The pore formation rate is thus calculated by the following formula.

$$\text{Pore formation rate}(\%) = \frac{\text{(number of pores)}}{\text{(number of dark flecks)}} \times 100$$

A low pore formation rate shows little contamination of facilities due to the component of the pigment which evaporates from the colored zirconia sintered bodies during sintering. In addition, a low pore formation rate indicates that the color tones characteristic to the present invention are achieved even in the parts of sintered bodies which are close to the surface thereof, and thus little work is required in polishing processing.

Furthermore, the sintered body of the present invention is preferably formed by dispersing a spinel phase of a compound represented by the formula $(Co_{1-x}Zn_x)(Fe_{1-y}Al_y)_2O_4$ ($0 \leq x \leq 0.5$, $0 < y \leq 0.5$), and a phase of $Al_2O_3$ or a phase where part of the elements in the pigment are mixed in the $Al_2O_3$ phase to form a solid solution. This is due to the following.

By containing Al in the spinel crystal structures, the pigment of the present invention which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination, achieves effects of suppressing color migration and preventing losses of pigments on the surface of sintered bodies. The elements which do not fall within the above stoichiometry of spinel structures are present as impurity phases and when an impurity phase does not contain Al, the impurity phase will cause color migration or loss of pigments from the surface of sintered bodies. However, it is considered that due to the presence of additional $Al_2O_3$, the elements in the components of the pigment mix in this additional $Al_2O_3$ and the effects of suppressing color migration and preventing losses of pigments on the surface of sintered bodies are achieved.

In the conventional black zirconia sintered bodies, especially those which do not contain Cr, sintered bodies which satisfy all the abovementioned sintering properties, mechanical properties, and color tones of the present invention have not been achieved.

The black zirconia sintered body of the present invention is achieved, for example, by sintering the zirconia-containing powder which contains 2 to 6 weight % of the pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination; 0.05 to 6 weight % of $Al_2O_3$; and 3.60 to 7.10 weight % of $Y_2O_3$, at a temperature of 1300 to 1500° C.

Sintering atmosphere is not particularly limited and the sintering in an oxidizing atmosphere such as air sintering may be carried out. Additionally, HIP sintering or the like may be combined where necessary.

Although the sintering rate of the black zirconia sintered body of the present invention is not particularly limited, the rate of temperature increase at the time of sintering may exceed 50° C./hour and even as high as 100° C./hour can be adopted. Although low sintering rates were conventionally required in black zirconia sintered bodies which contained added elements that are difficult to sinter in order to prevent cracks at the time of sintering, with the composition of the present invention, black zirconia sintered bodies which have no cracks and which are excellent in color tones, density, and bending strength are achieved even under these high-rate sintering conditions, which are different from those in the past.

When the sintered body of the present invention is used in exterior components or for the purpose of decoration, it can be used after polishing. The sintered body of the present invention has a low percentage of monoclinic crystals and defects are unlikely to occur on the surface of the sintered body due to polishing and an even better jewel-like appearance is obtained by mirror-polishing the surface.

The component of the pigment of the present invention which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination is excellent as a pigment for ceramics generally.

The pigment of the present invention is not particularly limited provided that it satisfies the composition represented by the formula $(Co_{1-x}Zn_x)(Fe_{1-y}Al_y)_2O_4$ ($0 \leq x \leq 0.5$, $0 < y \leq 0.5$).

Examples of the pigments of the present invention include dried powder as it is which is obtained by filtering, washing and drying of the coprecipitates obtained by adding alkali to the aqueous solution of the salts of Co, Zn, Fe, and Al; the complex oxides obtained by calcining the dried powder at a temperature of 500 to 1100° C.; and the complex oxides obtained by first mixing each of the oxides of Co, Zn, Fe, and Al and then calcining the mixture at a temperature of 1100 to 1350° C.

Among them, the former two subjected to coprecipitation treatment are particularly preferable as the pigments of the present invention. Even without calcination, those subjected to coprecipitation treatment change into spinel structures of a compound, which satisfies the composition of $(Co_{1-x}Zn_x)(Fe_{1-y}Al_y)_2O_4$ ($0 \leq x \leq 0.5$, $0 < y \leq 0.5$), during the sintering process after being mixed with other components, and thus the effects of the present invention are achieved.

The dried powder obtained by the coprecipitation treatment is soft because it is dried particles and the particle size thereof is small because they have not been subjected to a heat treatment, and thus also has an advantage in that it is readily dispersed to a high degree.

On the other hand, when mixing respective oxides of Co, Zn, Fe, and Al as they are, satisfactory spinel structures are unlikely to be obtained after being mixed with zirconia, and thus the effects of the present invention are difficult to achieve. Accordingly, when using powder of the above mixture as a raw material for pigments, it is preferable to use it by subjecting it to heat treatment to form spinel structures in advance.

When using the zirconia-containing powder of the present invention, products of sintered bodies having a uniform quality are obtained with a high yield since uniform sintered density is achieved in a wide range of temperatures. In addition, the black zirconia sintered body of the present invention has high density, high bending strength, and excellent color tones. Moreover, when the pigment of the present invention is used in sintered bodies, since it is difficult to evaporate at the time of sintering, problems of facility contamination and color migration from the sintered bodies due to the evaporation of components therein do not occur and in the obtained black sintered bodies, no pore formation is observed on the surface thereof, color tones are excellent, and little work is required for surface processing where necessary. Additionally, since neither of the powder, sintered body, nor pigment of the present invention contains Cr components, they are preferable from environmental viewpoints, and thus can be used in any field.

Although the present invention will be specifically described below using Examples, the present invention is not limited to these Examples.

EXAMPLE 1

A mixed powder was obtained as follows. Firstly, a dried powder was obtained by forming coprecipitates by adding ammonia water to the aqueous solution of the nitrate salts of Co, Zn, Fe, and Al, and then subjecting the obtained coprecipitates to filtering, washing, and drying. 96.0 weight % of zirconia powder TZ-3YS-E (which contained 0.25 weight % of $Al_2O_3$ in addition to the zirconia stabilized with 5.35 weight % of $Y_2O_3$ and which had a BET specific surface area of 6 m$^2$/g) manufactured by Tosoh Corporation, 3.5 weight % of the above dried powder as a pigment, and 0.5 weight % of the $Al_2O_3$, which was added separately from $Al_2O_3$ already contained in the zirconia powder, were wet-blended using a ball mill and then dried to obtain the mixed powder.

A plurality of compacts were obtained by forming the obtained mixed powder at a uniaxial compacting pressure of 700 kg/cm$^2$. Respective sintering temperatures were set for each of the compacts ranging from 1300° C. to 1500° C. at 50° C. intervals. Each compact was sintered by setting in an electric furnace at a rate of temperature increase of 100° C./hour and in an air atmosphere and by maintaining the sintering temperature for 1 hour when the predetermined temperatures were reached.

Note that when this dried powder was calcined separately at 800° C., it was verified that the chemical composition thereof was $(Co_{0.68}Zn_{0.32})(Fe_{0.70}Al_{0.30})_2O_4$.

Evaluation results of the performance of the obtained sintered body are shown in Table 1.

Figure 4:
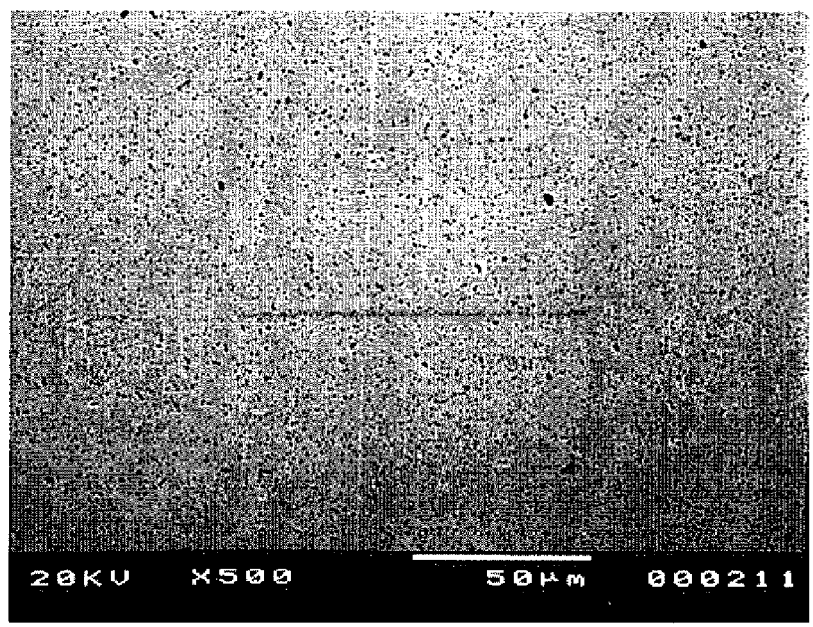
FIG. 4 is a scanning electron micrograph of the surface of the sintered body of Example 1 which is sintered at 1400° C. and is then mirror-polished.
Figure 6:
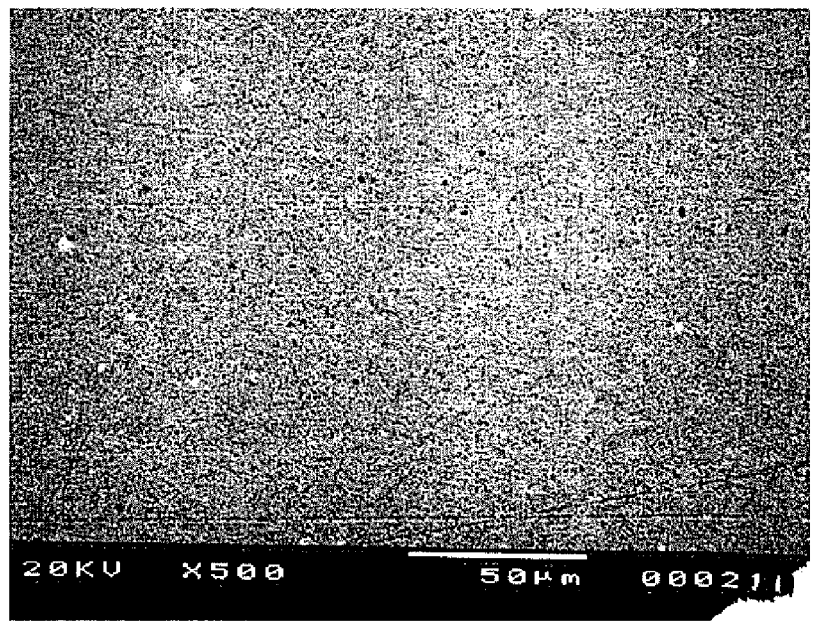
FIG. 6 is a scanning electron micrograph of the surface of the sintered body of Example 1 which is sintered at 1400° C., mirror-polished, and is then subjected to an etching treatment at 1350° C.

In addition, FIGS. 4 and 6 show SEM pictures of the surface of the sintered body of Example 1 which was sintered at 1400° C. and was then mirror-polished, and the surface of the sintered body which was subjected to an etching treatment at 1350° C. after mirror-polishing, respectively. The pigment on the surface of the sintered body was observed as black spots after the etching treatment. Additionally, the presence of spinel structures in the zirconia sintered body was verified from the results of XRD diffraction and electron diffraction of the surface of the sintered body.

EXAMPLE 2

The sintered body was obtained as in Example 1 except that 1.0 weight % of commercially available powdered $Al_2O_3$ was added separately from $Al_2O_3$ already contained in the zirconia powder and the sintering time was 2 hours.

Note that when this dried powder was calcined separately at 800° C., it was verified that the chemical composition thereof was $(Co_{0.68}Zn_{0.32})(Fe_{0.70}Al_{0.30})_2O_4$.

Evaluation results of the performance of the obtained sintered body are shown in Table 1.

EXAMPLE 3

The sintered body was obtained as in Example 1 except that 3.5 weight % of a dried powder with a different chemical composition was added as a pigment and the sintering time was 2 hours.

Note that when this dried powder was calcined separately at 800° C., it was verified that the chemical composition thereof was $Co(Fe_{0.50}Al_{0.50})_2O_4$.

Evaluation results of the performance of the obtained sintered body are shown in Table 1.

Although pore formation slightly increased and bending strength reduced due to the absence of Zn, satisfactory uniformity of strength, lightness, and sintering was maintained in the obtained sintered body.

EXAMPLE 4

The sintered body was obtained as in Example 1 except that 3.5 weight % of a calcined powder whose chemical composition was $(Co_{0.68}Zn_{0.32})(Fe_{0.70}Al_{0.30})_2O_4$ was added as a pigment and the sintering time was 2 hours.

Evaluation results of the performance of the obtained sintered body are shown in Table 1.

EXAMPLE 5

The sintered body was obtained as in Example 1 except that 3.5 weight % of a calcined powder whose chemical composition was $(Co_{0.68}Zn_{0.32})(Fe_{0.70}Al_{0.30})_2O_4$ was added as a pigment; 1.0 weight % of commercially available powdered $Al_2O_3$ was added separately from $Al_2O_3$ already contained in the zirconia powder; and the sintering time was 2 hours.

Evaluation results of the performance of the obtained sintered body are shown in Table 1.

EXAMPLE 6

The sintered body was obtained as in Example 1 except that 3.5 weight % of a calcined powder whose chemical composition was $Co(Fe_{0.50}Al_{0.50})_2O_4$ was added as a pigment and the sintering time was 2 hours.

Evaluation results of the performance of the obtained sintered body are shown in Table 1.

COMPARATIVE EXAMPLE 1

The sintered body was obtained as in Example 1 except that 3.5 weight % of the dried powder which contained Cr was added as a pigment and that the sintering time was 2 hours.

Note that when this dried powder was calcined separately at 800° C., it was verified that the chemical composition thereof was $Co(Fe_{0.64}Cr_{0.36})_2O_4$.

Evaluation results of the performance of the obtained sintered body are shown in Table 2. The obtained sintered body had a large number of pores, low strength, and high lightness, which was disadvantageous.

Figure 5:
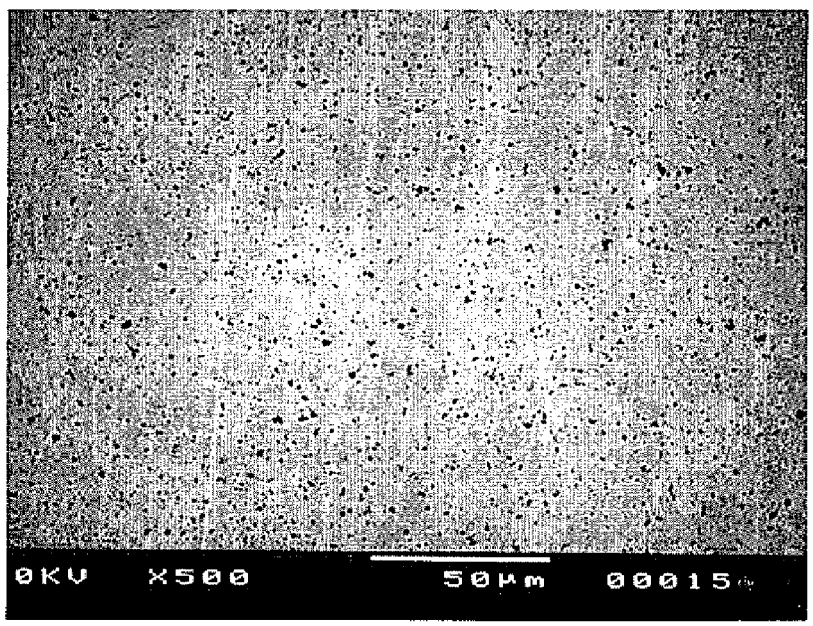
FIG. 5 is a scanning electron micrograph of the surface of the sintered body of Comparative Example 1 which is sintered at 1400° C. and is then mirror-polished.
Figure 7:
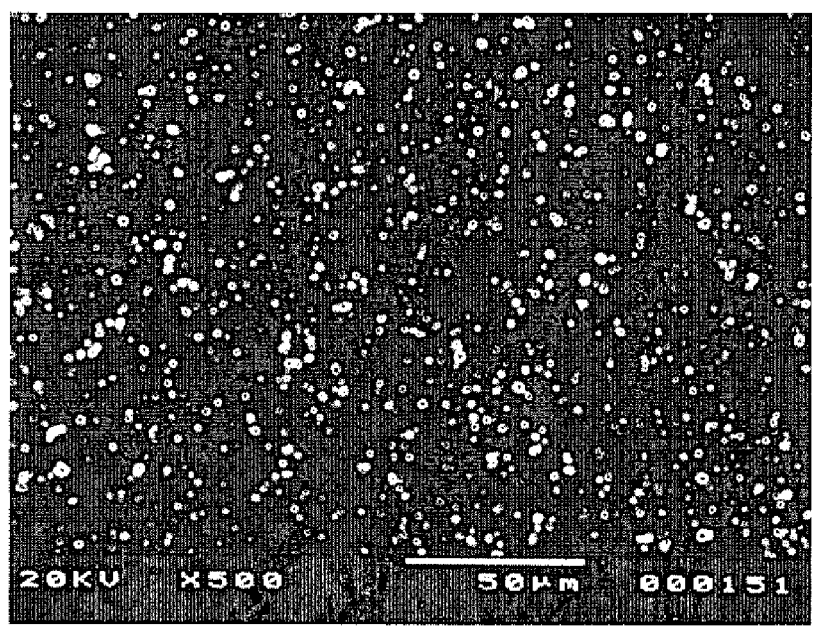
FIG. 7 is a scanning electron micrograph of the surface of the sintered body of Comparative Example 1 which is sintered at 1400° C., mirror-polished, and is then subjected to an etching treatment at 1350° C.

FIGS. 5 and 7 show SEM pictures of the surface of the sintered body of Comparative Example 1 which was sintered at 1400° C. and was then mirror-polished, and the surface of the sintered body which was subjected to an etching treatment at 1350° C. after mirror-polishing, respectively. The pigment on the surface of the sintered body was lost and the surface was covered with pores which were observed as white bright spots.

COMPARATIVE EXAMPLE 2

The sintered body was obtained as in Example 1 except that 96.5 weight % of zirconia powder TZ-3.5YS-E (which contained 0.25 weight % of $Al_2O_3$ in addition to the zirconia stabilized with 6.25 weight % of $Y_2O_3$ and which had a BET specific surface area of 6 m$^2$/g) manufactured by Tosoh Corporation was used; 3.5 weight % of Co $(Fe_{0.64}Cr_{0.36})_2O_4$ which was obtained by calcining the Cr-containing coprecipitates at 1350° C. was used as a pigment; and the sintering time was 2 hours.

Evaluation results of the performance of the obtained sintered body are shown in Table 2.

The obtained sintered body had a large number of pores, low strength, and high lightness, which was disadvantageous similar to the one obtained in Comparative Example 1.

COMPARATIVE EXAMPLE 3

The sintered body was obtained as in Example 1 except that zirconia powder TZ-3YS (which was stabilized with 5.35 weight % of $Y_2O_3$ and which had a BET specific surface area of 6 m$^2$/g) manufactured by Tosoh Corporation was used; 3.5 weight % of the dried powder which only contains Co and Fe was used as a pigment; and the sintering time was 2 hours.

Note that when this dried powder was calcined separately at 800° C., it was verified that the chemical composition thereof was $CoFe_2O_4$.

Evaluation results of the performance of the obtained sintered body are shown in Table 2. Although the number of pores decreased, the obtained sintered body had low bending strength and high lightness, which was disadvantageous. Moreover, cracks were observed in the sintered body at 1500° C., and thus it was capable of being sintered only within a narrow temperature range.

COMPARATIVE EXAMPLE 4

The sintered body was obtained as in Example 1 except that 96.5 weight % of the zirconia powder TZ-3YS-E was used; 3.5 weight % of the dried powder which only contains Co and Fe was used as a pigment; and the sintering time was 2 hours.

Note that when this dried powder was calcined separately at 800° C., it was verified that the chemical composition thereof was $CoFe_2O_4$.

Evaluation results of the performance of the obtained sintered body are shown in Table 2. The obtained sintered body had inferior sintering properties similar to those in Comparative Example 3.

COMPARATIVE EXAMPLE 5

The sintered body was obtained as in Example 1 except that 96.5 weight % of the zirconia powder TZ-3YS-E was used; 3.5 weight % of the dried powder which contained Co, Fe, and Zn was used as a pigment; and the sintering time was 2 hours.

Note that when this dried powder was calcined separately at 800° C., it was verified that the chemical composition thereof was $(Co_{0.56}Zn_{0.44})Fe_2O_4$.

Evaluation results of the performance of the obtained sintered body are shown in Table 2. The obtained sintered body had inferior sintering properties similar to those in Comparative Example 3.

COMPARATIVE EXAMPLE 6

The sintered body was obtained as in Example 1 except that 96.5 weight % of zirconia powder TZ-3YS (which was stabilized with 5.35 weight % of $Y_2O_3$ and which had a BET specific surface area of 6 $m^2/g$) manufactured by Tosoh Corporation was used; 3.5 weight % of the dried powder which contained a large amount of Zn and whose composition did not fall within the range of the present invention was used as a pigment; and the sintering time was 2 hours.

Evaluation results of the performance of the obtained sintered body are shown in Table 2. The obtained sintered body had inferior sintering properties similar to those in Comparative Example 3.

Note that when this dried powder was calcined separately at 800° C., it was verified that the chemical composition thereof was $(Co_{0.42}Zn_{0.58})(Fe_{0.71}Al_{0.29})_2O_4$.

INDUSTRIAL APPLICABILITY

When using the zirconia-containing powder of the present invention, products of sintered bodies having a uniform quality are obtained with a high yield since uniform sintered density is achieved in a wide range of temperatures. In addition, the black zirconia sintered body of the present invention has high density, high strength, and excellent color tones. Moreover, when the pigment of the present invention is used in sintered bodies, since it is difficult to evaporate at the time of sintering, problems of facility contamination and color migration from the sintered bodies due to the evaporation of components therein do not occur and in the obtained black sintered bodies, no pore formation is observed on the surface thereof, color tones are excellent, and little work is required for surface processing where necessary. Additionally, since neither of the powder, sintered body, nor pigment of the present invention contains Cr components, they are preferable from an environmental standpoint, and thus can be used in any field.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

TABLE 1

| Example No. | Pigment composition | x Zn/(Co+Zn) | y Al/(Fe+Al) | Amount of $Al_2O_3$ addition Wt. % | Relative density of sintered body 1300° C. % | 1350° C. % | 1400° C. % | 1450° C. % | 1500° C. % | Pore formation rate % | Sintered body prepared at 1350 to 1450° C. Bending strength kgf/mm² | Lightness |
|---|---|---|---|---|---|---|---|---|---|---|---|---|
| 1 | Fe—Co—Al—Zn | 0.32 | 0.3 | 0.74 | 98.4 | 99 | 99.4 | 99.5 | 99.5 | 0 | 130-133 | 8.94-9.21 |
| 2 | Fe—Co—Al—Zn | 0.32 | 0.3 | 1.24 | 98.5 | 99.3 | 99.5 | 99.5 | 99.4 | 0 | 123-134 | 9.49-9.77 |
| 3 | Fe—Co—Al | 0 | 0.5 | 0.24 | 98.5 | 99.1 | 99.4 | 99.4 | 97.3 | 6 | 118-126 | 8.81-9.35 |
| 4 | Fe—Co—Al—Zn | 0.32 | 0.3 | 0.74 | 98.3 | 99.2 | 99.5 | 99.5 | 99.5 | 0 | 127-131 | 8.86-9.46 |
| 5 | Fe—Co—Al—Zn | 0.2 | 0.3 | 1.24 | 98.6 | 99.3 | 99.4 | 99.5 | 99.5 | 0 | 124-134 | 9.01-9.48 |
| 6 | Fe—Co—Al | 0 | 0.5 | 0.24 | 98.6 | 99.2 | 99.4 | 99.4 | 97.5 | 8 | 116-123 | 8.87-9.42 |

TABLE 2

| Comp. Example No. | Pigment composition | x Zn/(Co+Zn) | y Al/(Fe+Al) | Amount of $Al_2O_3$ addition wt. % | Relative density of sintered body 1300° C. % | 1350° C. % | 1400° C. % | 1450° C. % | 1500° C. % | Pore formation rate % | Sintered body prepared at 1350 to 1450° C. Bending strength kgf/mm² | Lightness |
|---|---|---|---|---|---|---|---|---|---|---|---|---|
| 1 | Fe—Cr—Co | 0.00 | 0.00 | 0.24 | 95.2 | 98.1 | 98.9 | 99.3 | 99.3 | ≅100 | 96-119 | 9.34-11.86 |
| 2 | Fe—Cr—Co | 0.00 | 0.00 | 0.24 | 96.1 | 97.4 | 99.1 | 99.3 | 99.3 | ≅100 | 97-118 | 9.36-14.03 |
| 3 | Fe—Co | 0.00 | 0.00 | 0.00 | | 98.3 | 97.9 | x | x | 20 | 103-104 | (9.17-9.48) |
| 4 | Fe—Co | 0.00 | 0.00 | 0.24 | 97.6 | 98.9 | 99.2 | 99.4 | x | 16 | 117-123 | 8.34-9.05 |
| 5 | Fe—Co—Zn | 0.44 | 0.00 | 0.24 | 97.8 | 98.3 | 98.0 | x | x | 54 | 120-126 | (9.27-10.03) |
| 6 | Fe—Co—Al—Zn | 0.58 | 0.29 | 0.00 | 97.7 | 98.6 | 99.1 | 99.3 | 96.8 | 68 | 108-119 | 9.67-10.56 | x: Presence of cracks in sintered body

What is claimed is:

1. Zirconia-containing powder comprising:
   2 to 6 weight % of a pigment which has a spinel structure represented by the formula $(Co_{1-x}Zn_x)(Fe_{1-y}Al_y)_2O_4$ ($0 \leq x \leq 0.5$, $0 < y \leq 0.5$) or which is a coprecipitated material containing Co, Zn, Fe, and Al and has the spinel structure after calcination;
   0.05 to 6 weight % of $Al_2O_3$; and
   3.60 to 7.10 weight % of $Y_2O_3$.

2. The zirconia-containing powder according to claim 1, wherein the pigment is a coprecipitated material which contains Co, Zn, Fe, and Al.

3. A black zirconia sintered body comprising:
   2 to 6 weight % of a pigment which has a spinel structure represented by the formula $(Co_{1-x}Zn_x)(Fe_{1-y}Al_y)_2O_4$ ($0 \leq x \leq 0.5$, $0 < y \leq 0.5$);
   0.05 to 6 weight % of $Al_2O_3$; and
   3.60 to 7.10 weight % of $Y_2O_3$.

4. The black zirconia sintered body according to claim 3, wherein relative density is 99.0% or more.

5. The black zirconia sintered body according to claim 3, wherein a phase of the spinel structure represented by the formula $(Co_{1-x}Zn_x)(Fe_{1-y}Al_y)_2O_4$ ($0 \leq x \leq 0.5$, $0 < y \leq 0.5$), and a phase of $Al_2O_3$ or a phase where part of the elements in the pigment is mixed in the $Al_2O_3$ phase to form a solid solution are dispersed on the surface of the sintered body.

6. The black zirconia sintered body according to any one of claims 3 to 5,
   wherein pore formation rate on the surface of the sintered body, which is mirror-polished and then subjected to a 1-hour etching treatment at a temperature 50° C. lower than a sintering temperature, is 50% or less.

* * * * *